Figures 1, 2, 3, 4:
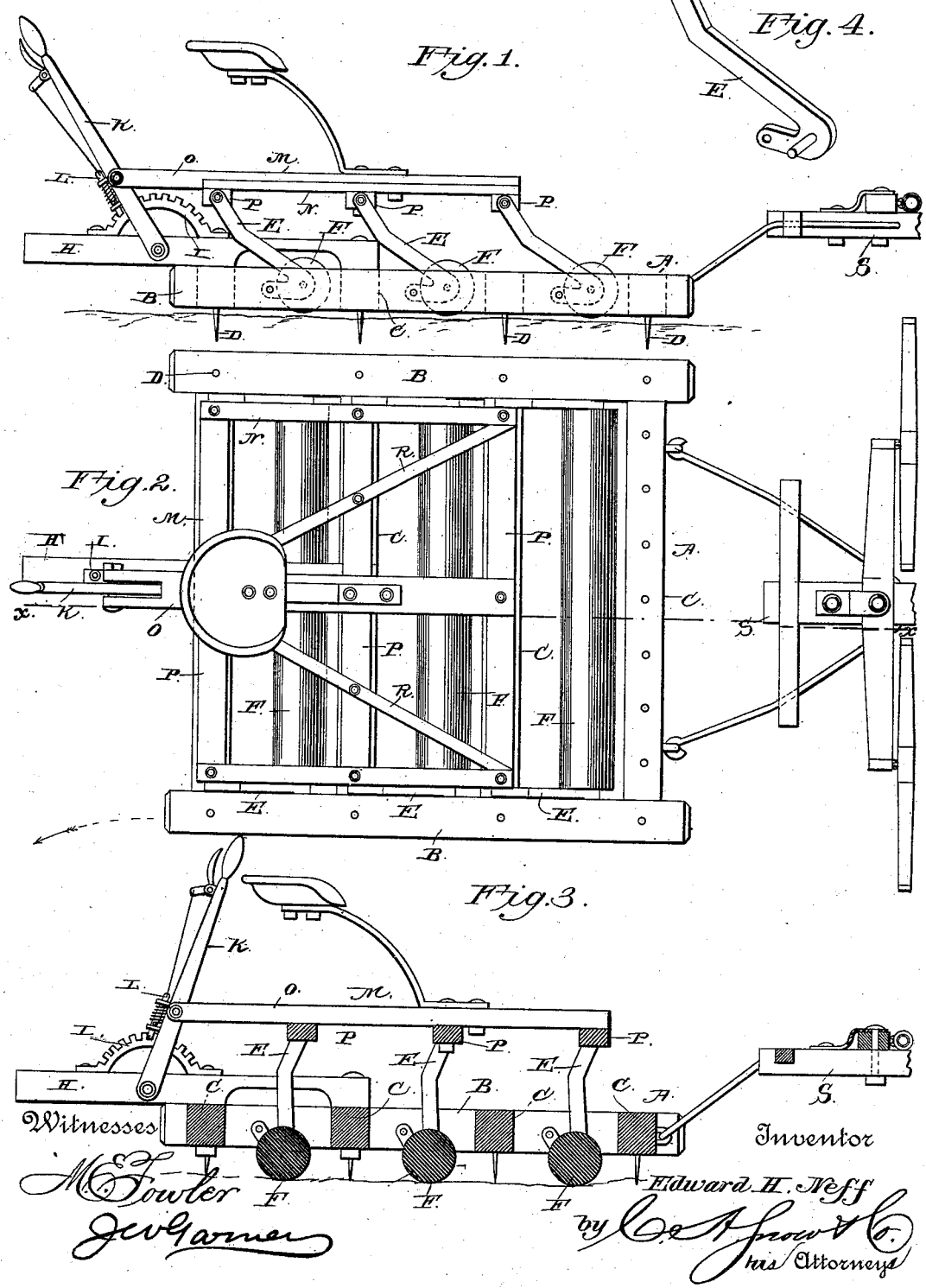

(No Model.)

E. H. NEFF.
COMBINED HARROW AND ROLLER.

No. 372,759. Patented Nov. 8, 1887.

Witnesses
M. Fowler
J. W. Garner

Inventor
Edward H. Neff
by C. A. Snow & Co.
his Attorneys

UNITED STATES PATENT OFFICE.

EDWARD HORNER NEFF, OF ROGERSVILLE, OHIO.

COMBINED HARROW AND ROLLER.

SPECIFICATION forming part of Letters Patent No. 372,759, dated November 8, 1887.

Application filed August 20, 1887. Serial No. 247,473. (No model.)

*To all whom it may concern:*

Be it known that I, EDWARD HORNER NEFF, a citizen of the United States, residing at Rogersville, in the county of Tuscarawas and State of Ohio, have invented a new and useful Improvement in Combined Harrows and Rollers, of which the following is a specification.

My invention relates to an improvement in combined harrows and rollers; and it consists in the peculiar construction and combination of devices, that will be more fully set forth hereinafter, and particularly pointed out in the claims.

In the accompanying drawings, Figure 1 is a side elevation of a combined harrow and roller embodying my improvements. Fig. 2 is a top plan view of the same. Fig. 3 is a longitudinal sectional view taken on the line $x\ x$ of Fig. 2. Fig. 4 is a detail view of one of the suspending-links.

A represents a rectangular harrow-frame, which comprises the side beams, B, and the transverse connecting-beams C, which are arranged at suitable distances apart and are provided with harrow-teeth D. Similar teeth are also attached to the side beams, B.

E represents a series of links, which are of the form shown in Figs. 1 and 3, and have their lower ends pivoted to the inner sides of the beams B, the said links being arranged between the cross-beams C. The upper ends of the links extend above the harrow-frame.

F represents a series of cylindrical rollers of suitable length and diameter, the said rollers being provided with boxes to receive trunnions, which are formed with the links E, one of the said rollers being located between each pair of the cross-bars C. From the rear side of the harrow-frame projects a bar, H, which is provided with a toothed segment, I.

K represents a lever, the lower end of which is pivoted to the bar H. The said lever bears against the toothed segment, and is provided with a spring-actuated bolt, L, adapted to engage the teeth of the segment, and thereby secure the lever thereto at any desired angle.

M represents an elevating-frame, which comprises the side bars, N, the longitudinal central bar, O, cross-bars P, which connect the said bars N and O, and diagonal brace-bars R. This elevating-frame is arranged over the harrow, and is pivotally connected to the upper ends of the links E, to which the rollers are journaled. The rear end of the bar O is connected to the operating-lever K.

S represents a draft-pole or tongue which is connected to the front bar of the harrow-frame in the usual manner, and is provided with the double and single trees for the attachment of the draft-animals.

The operation of my invention is as follows: By moving the lever K rearward to the position indicated in Fig. 1, the links E will be turned so as to elevate the rollers and prevent the same from coming in contact with the ground when the harrow is in operation. By moving the lever K forward, the elevating-frame is caused to turn the links on their pivots in such a manner as to lower the rollers to the ground and cause them to roll the soil at the same time that the harrow-teeth are in operation, the combined effects of the harrow-teeth and of the rollers being to level the ground and to thoroughly pulverize and stir the same.

Having thus described my invention, I claim—

1. The combination of the harrow-frame, the links E, having one end pivoted thereto and extending thereabove, the rollers journaled between the links, the elevating-frame pivotally secured to the upper ends of the links, and the lever fulcrumed on the harrow-frame and pivotally connected to the elevating-frame, as set forth.

2. The combination of the harrow-frame having the transverse beams C, provided with harrow-teeth, the links E, pivoted at their lower ends to the side bars of the harrow-frame, the rollers journaled to the links E and arranged between the beams C, the elevating-frame pivoted to the upper ends of the links, and the lever fulcrumed on the harrow-frame and pivotally connected to the elevating-frame, substantially as specified.

In testimony that I claim the foregoing as my own I have hereto affixed my signature in presence of two witnesses.

EDWARD HORNER NEFF.

Witnesses:
　DANIEL SCHWARM,
　WILLIAM OUSE.